United States Patent

[11] 3,618,047

[72] Inventor Theodore M. Hertz
Whittier, Calif.

[21] Appl. No. 885,165
[22] Filed Dec. 15, 1969
[45] Patented Nov. 2, 1971
[73] Assignee North American Rockwell Corporation

[54] SYSTEM FOR THE COMPACT STORAGE OF DECIMAL NUMBERS
9 Claims, 3 Drawing Figs.

[52] U.S. Cl. .......... 340/172.5, 235/155, 340/347 DD
[51] Int. Cl. .......... G06f 5/02
[50] Field of Search .......... 340/172.5, 347 DD; 235/155

[56] References Cited

UNITED STATES PATENTS

| | | | |
|---|---|---|---|
| 3,310,786 | 3/1967 | Rinaldi et al. .......... | 340/172.5 |
| 3,432,811 | 3/1969 | Rinaldi et al. .......... | 340/172.5 |

OTHER REFERENCES

Bender, R. R. and Galage, D. J.; " Packing Mode Control" In IBM Technical Disclosure Bulletin; Vol. 4, No. 3, August, 1961; pp. 61- 63; 340/172.5.

Tilem, J. Y: " Data Packing and Unpacking Means" In IBM Technical Disclosure Bulletin; Vol. 5, No. 7, December, 1962; pp. 48- 49; 340/172.5

Lengyel, E. J. and McMahon, R. F.; " Direct Decimal to Binary Address Generator For Small Memories" In IBM Technical Disclosure Bulletin; Vol. 9, No. 10, March, 1967; p. 1347; 340/347

*Primary Examiner*—Raulfe B. Zache
*Assistant Examiner*—Melvin B. Chapnick
*Attorneys*—L. Lee Humphries, H. Fredrick Hamann and Robert G. Rogers

ABSTRACT: The system includes encoding logic which examines each bit of a decimal number to determine the number and position of high-valued digits, eight or nine, in the decimal number. Certain storage bit positions are allocated to the high-valued digits. The high-valued digits are not encoded in the normal sense. The logic state of the certain storage bit positions indicate value and position of the high-valued digits in the decimal number. The remaining digits of the decimal number are encoded and stored in the remaining bit positions. Decoding logic examines the stored bits of information to provide as an output the decoded decimal number.

INVENTOR.
THEODORE M. HERTZ

BY Robert G. Rogers
ATTORNEY

INVENTOR.
THEODORE M. HERTZ

BY Robert G. Rogers
ATTORNEY

INVENTOR.
THEODORE M. HERTZ

BY Robert G. Rogers

ATTORNEY

SYSTEM FOR THE COMPACT STORAGE OF DECIMAL NUMBERS

BACKGROUND OF THE INVENTION

1. Field of the Invention

The invention relates to a system for compact storage of decimal numbers and more particularly to a system in which certain bits of information are stored to indicate the value and position of certain digits of the numbers.

2. Description of Prior Art

Storage of decimal numbers by certain systems normally requires four bits of storage space per decimal digit. It would be preferred if the storage requirements for a decimal number could be reduced. In that way, the usable capacity of a memory could be increased without increasing the actual storage area. However, the increased advantages would be slight if slow and/or complex arithmetic conversions were required as part of the reduction process.

Therefore, a system is preferred which can encode a decimal number to reduce the storage space normally required to store the number. The preferred system would also require a decoder for generating the decimal number from the stored bits. The encoding and decoding logic for compacting the storage should be relatively fast without requiring a complex arithmetic conversion. The present invention provides the preferred capability required for a compact storage system.

SUMMARY OF THE INVENTION

Briefly, the system for compacting the storage of decimal numbers includes logic for encoding a decimal number so that the storage of each bit of the decimal number is not required. Certain encoded bits indicate the position and value of certain valued digits of the decimal number, e.g., an 8 or a 9. The encoded bits, less in number than the bits required to represent a decimal number, are stored. Decoding logic receives the stored encoded bits from storage and produces as an output the decimal number represented by the stored bits.

In a preferred system, 12 Binary Coded Decimal (BCD) bits of three decimal digits, each digit comprising four of the bits, can be encoded and stored in 10 bits of storage area. The low-valued digits, 0—7, are stored in actual groups while the high-valued digits are represented by other stored bits.

Decimal numbers of other digits may be encoded in a manner similar to the encoding of a decimal number having three digits. For example, 20 bits are required to encode a decimal number having six digits.

In addition, although the preferred embodiment is described for BCD, the system may be used for compacting numbers represented by any decimal code. For example, the system can be used to compact numbers represented by an excess 3 code. The separation of the digits by value may be changed as a function of the decimal code used.

The system is useful in computers, data processors, etc., involving storage of numerical data in a decimal form. It is also useful for read-only memory systems which store tables of values for trigonometric functions, logarithms, etc. In such systems, only decoding is required.

Therefore, it is an object of this invention to provide a system for compacting the storage of decimal numbers.

It is another object of this invention to provide a process for compacting the storage of decimal numbers.

A further object of this invention is to provide a system for encoding bits representing a decimal number so that a reduced number of bits of storage space is required for the decimal number.

A still further object of the invention is to provide a compact storage system in which certain stored bits indicate the value and position of the high-valued digits of a decimal number and other stored bits represent the remaining digits of the decimal number.

Another object of this invention is to provide a compact storage system which can be used to reduce the number of bits required for storing decimal numbers represented by any decimal code.

A still further object of the invention is to provide a simple encoding and decoding scheme which permits storage of groups of three decimal digits by using the same logic for either the serial or parallel encoding and decoding of the three decimal digits.

A further object of the invention is to provide a compact storage scheme that does not require relatively slow and/or complex arithmetic conversions.

These and other objects of the invention will become more apparent when taken in connection with the drawings, a brief description of which follows:

DESCRIPTION OF PREFERRED EMBODIMENT

Figure 1:
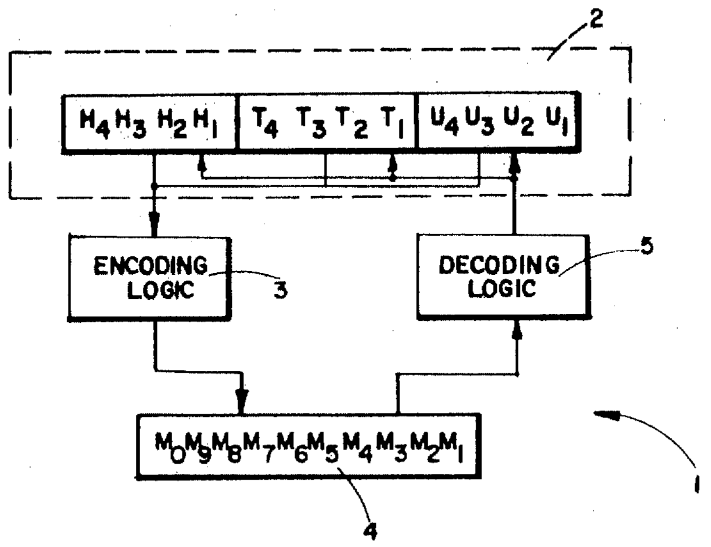
FIG. 1 is a block diagram illustrating the process of the compacting system.

FIG. 1 illustrates a block diagram of the compacting system 1. Block 2 represents the 12 Binary Coded Decimal (BCD) bits of a three-digit decimal number. The 12 bits may be contained in an input storage register or by any means which processes a number for storage in a memory. The hundreds digit is represented by bit positions $H_4$–$H_1$; the tens digit by bit positions $T_4$–$T_1$; and the units digit by bit positions $U_4$–$U_1$.

The number of decimal digits may be increased by increasing the number of bits used to represent the number. For example, four additional bits could be added to represent the thousands digit of a decimal number. The number of bits and logic configuration of a decimal number depend on the numerical code being used. In the FIG. 1 embodiment, the decimal digits are represented by a Binary Coded Decimal code. It should be understood, however, that other codes are also within the scope of the invention. A Binary Coded Decimal code was selected for purposes of describing one embodiment of the invention.

It is also pointed out that the logic of FIG. 1 could be duplicated for parallel operation or used serially to encode and store a decoded number having any number of digits. The number could be processed in groups of three digits each.

Block 3 in FIG. 1 represents the encoding logic and block 5 the decoding logic between the decimal number presented for storage and the storage locations for the encoded and stored bits. The encoded bits may be stored in storage locations of a memory, such as a plated wire memory, core memory, and other types of memories well known to persons skilled in the art. In FIG. 1, the storage area is represented by block 4.

Figure 2:
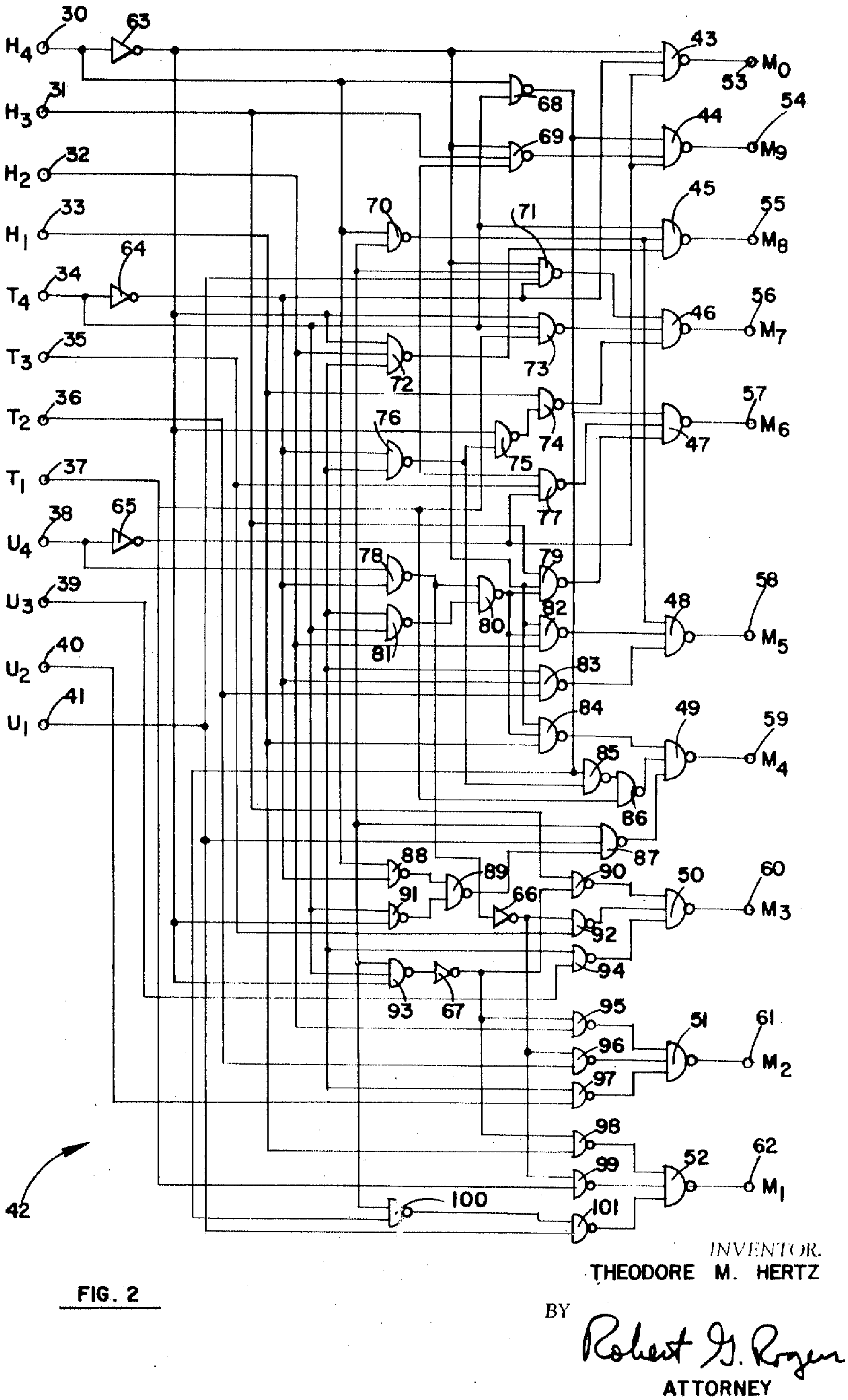
FIG. 2 is a schematic diagram of one embodiment of encoding logic comprising part of the compacting system.
Figure 3:
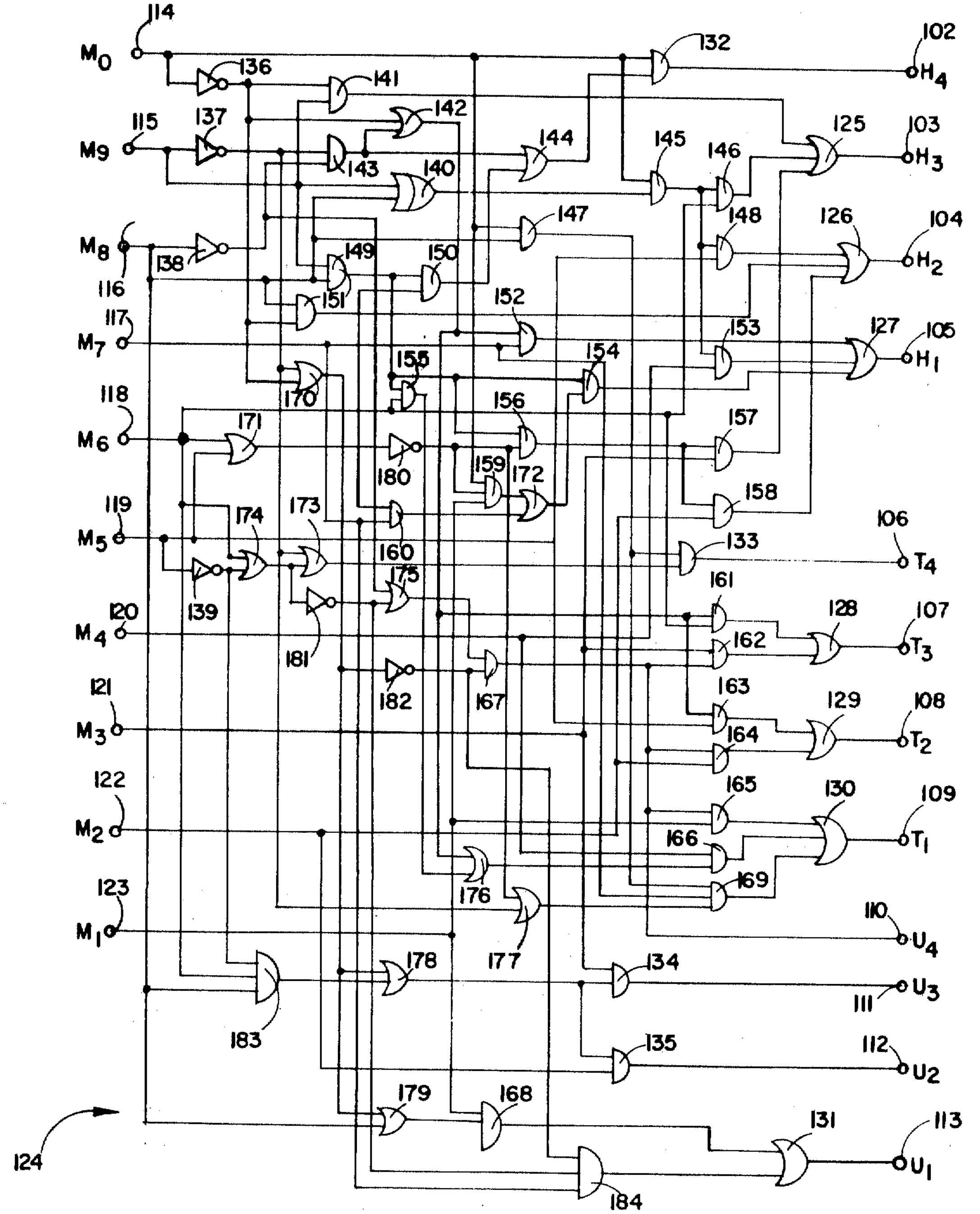
FIG. 3 is a schematic diagram of one embodiment of decoding logic comprising part of the compacting system.

The encoding and decoding logic, blocks 3 and 5, are shown in more detail in FIGS. 2 and 3 respectively. The decimal number in block 2 is encoded by logic in block 3 for storage in storage locations in block 4. The stored bits in block 4 are decoded by logic in block 5 for reading out the decimal number into block 2.

The decimal number is encoded so that it is not necessary to store bits representing each digit. Normally, as indicated by block 2, 12 bits are required to store three decimal digits represented by BCD code. However, as indicated in the FIG. 1, only 10 bits are required to store the three decimal digits. The reduction in storage space is made possible by utilizing certain storage bits to represent the position and value of the high-valued decimal digits. The remaining decimal digits are encoded and stored in octal form in the remaining bit positions of storage represented by block 4. The storage bit locations are designated by $M_0$, $M_9$–$M_1$.

A similar compacting scheme can be used to encode and decode two decimal digits, normally requiring eight bits of storage, in seven bit codes storage. For a two-digit number, the first storage bit, for example $M_0$, is used to indicate the high-valued bit. Storage bits $M_6$–$M_1$ are also used. Storage bits $M_9$–$M_7$ may be eliminated for a two-digit system. An example of the utility of having both a three-digit scheme and a two-digit scheme in one system can be seen by considering an 11-digit number. Ordinarily, 44 storage bits are required to store an 11-digit decimal number. By using a three decimal digit and two decimal digit compacting scheme, only 37 bits of storage space are required. There is no advantage in providing a compacting storage scheme for one decimal digit.

In the description of the preferred embodiment of the invention, decimal digits 8 and 9 are described as being the high-valued, or large, decimal digits and decimal digits 0 through 7 are described as being the low-valued or small digits. The larger digits are represented by the logic state of certain of the storage bits while the least significant digits are stored in octal form in other storage locations.

If a logic zero is stored in $M_0$, all the decimal digits are relatively small and are represented by the logic bits stored in bit positions $M_9$–$M_1$. The numbers are encoded and stored in octal groups. If a logic one is stored in $M_0$, and if $M_9$ and $M_8$ are not both ones, the bit positions $M_8$ and $M_9$ indicate the relative position of a single large digit and $M_7$ indicates whether the large digit is an 8 or a 9. Bit positions $M_6$ through $M_1$ store the value of the two remaining small digits.

If bit positions $M_0$, $M_9$ and $M_8$ are ones, the decimal number contains two large digits. The $M_6$ and $M_5$ bit positions indicate the relative position of the remaining small decimal digit which is stored in bit positions $M_3$ through $M_1$. Bit positions $M_7$ and $M_4$ indicate the position and whether the large digits are 8 and/or 9.

If $M_0$, $M_9$, $M_8$, $M_6$ and $M_5$ are ones, all three decimal digits are large numbers. In that case, bit positions $M_7$, $M_4$ and $M_1$ indicate the position of and whether the digits are 8 and/or 9.

A summary of the encoding process is contained in table I as follows:

TABLE II $M_0$=0

$M_9$, $M_8$, $M_7$ represent hundreds decimal digit in octal.
$M_6$, $M_5$, $M_4$ represent tens decimal digit in octal.
$M_3$, $M_2$, $M_1$ represent units decimal digit in octal.

$M_0$=1

$M_9$, $M_8$ indicate position of a single 8 or 9 decimal digit.
$M_9'$, $M_8'$ indicate that the hundreds digit is an 8 or a 9.
$M_9$, $M_8'$ indicate that the units digit is an 8 or a 9.
$M_9'$, $M_8$ indicate that the tens digit is an 8 or a 9.
$M_7'$ indicates that the digit is an 8.
$M_7$ indicates that the digit is a 9.
$M_6$, $M_5$, $M_4$ represent leading small decimal digit in octal.
$M_3$, $M_2$, $M_1$ represent trailing small decimal digit in octal.

$M_0$=$M_9$=$M_8$=1 two digits are an 8 or a 9.
$M_6$, $M_5$ indicate the position of the third digit.
$M_3$, $M_2$, $M_1$ represent the third decimal digit in octal.
$M_7$ and $M_4$ indicate the relative values of the large digits in the corresponding positions.

$M_0$=$M_9$=$M_8$=$M_6$=$M_5$=1

All three digits are 8 or 9.
$M_7$, $M_4$, $M_1$ indicate whether the digits in the corresponding positions are 8's or 9's.

The above tables can be used to describe a specific example wherein a decimal number is encoded and stored in memory. For purposes of the illustration, suppose the decimal number 962 is processed into an input register for encoding and storage. Since the decimal number contains a relatively large digit, 9, then $M_0$=1. $M_7$=1 indicates that the large digit is a 9.

TABLE I

| $M_0$ | $M_9$ | $M_8$ | $M_7$ | $M_6$ | $M_5$ | $M_4$ | $M_3$ | $M_2$ | $M_1$ | Explanation |
|---|---|---|---|---|---|---|---|---|---|---|
| 0 | $H_3$ | $H_2$ | $H_1$ | $T_3$ | $T_2$ | $T_1$ | $U_3$ | $U_2$ | $U_1$ | All decimal digits less than 8. |
| 1 | 0 | 0 | 0 | $T_3$ | $T_2$ | $T_1$ | $U_3$ | $U_2$ | $U_1$ | Hundred's digit=8. |
| 1 | 0 | 0 | 1 | $T_3$ | $T_2$ | $T_1$ | $U_3$ | $U_2$ | $U_1$ | Hundred's digit=9. |
| 1 | 0 | 1 | 0 | $H_3$ | $H_2$ | $H_1$ | $U_3$ | $U_2$ | $U_1$ | Ten's digit=8. |
| 1 | 0 | 1 | 1 | $H_3$ | $H_2$ | $H_1$ | $U_3$ | $U_2$ | $U_1$ | Ten's digit=9. |
| 1 | 1 | 0 | 0 | $H_3$ | $H_2$ | $H_1$ | $T_3$ | $T_2$ | $T_1$ | Unit's digit=8. |
| 1 | 1 | 0 | 1 | $H_3$ | $H_2$ | $H_1$ | $T_3$ | $T_2$ | $T_1$ | Unit's digit=9. |
| 1 | 1 | 1 | 0 | 0 | 0 | 0 | $H_3$ | $H_2$ | $H_1$ | Ten's and units digits=8. |
| 1 | 1 | 1 | 1 | 0 | 0 | 0 | $H_3$ | $H_2$ | $H_1$ | Ten's=9, unit's=8. |
| 1 | 1 | 1 | 0 | 0 | 0 | 1 | $H_3$ | $H_2$ | $H_1$ | Ten's=8, unit's=9. |
| 1 | 1 | 1 | 1 | 0 | 0 | 1 | $H_3$ | $H_2$ | $H_1$ | Ten's and units=9. |
| 1 | 1 | 1 | 0 | 0 | 1 | 0 | $T_3$ | $T_2$ | $T_1$ | Hundred's and units=8. |
| 1 | 1 | 1 | 1 | 0 | 1 | 0 | $T_3$ | $T_2$ | $T_1$ | Hundred's=9, unit's=8. |
| 1 | 1 | 1 | 0 | 0 | 1 | 1 | $T_3$ | $T_2$ | $T_1$ | Hundred's=8, unit's=9. |
| 1 | 1 | 1 | 1 | 0 | 1 | 1 | $T_3$ | $T_2$ | $T_1$ | Hundred's and unit's=9. |
| 1 | 1 | 1 | 0 | 1 | 0 | 0 | $U_3$ | $U_2$ | $U_1$ | Hundred's and ten's=8. |
| 1 | 1 | 1 | 1 | 1 | 0 | 0 | $U_3$ | $U_2$ | $U_1$ | Hundred's=9, ten's=8. |
| 1 | 1 | 1 | 0 | 1 | 0 | 1 | $U_3$ | $U_2$ | $U_1$ | Hundred's=8, ten's=9. |
| 1 | 1 | 1 | 1 | 1 | 0 | 1 | U | U | U | Hundred's and ten's=9. |
| 1 | 1 | 1 | 0 | 1 | 1 | 0 | X | X | 0 | All digits=8. |
| 1 | 1 | 1 | 0 | 1 | 1 | 0 | X | X | 1 | h=8, t=8, u=9. |
| 1 | 1 | 1 | 0 | 1 | 1 | 1 | X | X | 0 | h=8, t=9, u=8. |
| 1 | 1 | 1 | 0 | 1 | 1 | 1 | X | X | 1 | h=8, t=u=9. |
| 1 | 1 | 1 | 1 | 1 | 1 | 0 | X | X | 0 | h=9, t=u=8. |
| 1 | 1 | 1 | 1 | 1 | 1 | 0 | X | X | 1 | h=9, t=8, u=9. |
| 1 | 1 | 1 | 1 | 1 | 1 | 1 | X | X | 0 | h=9, t=9, u=8. |
| 1 | 1 | 1 | 1 | 1 | 1 | 1 | X | X | 1 | All digits=9. |

X's represent unused bits for the particular digital number being encoded. The H, T and U letters indicate that octal groups representing the corresponding decimal digits are stored in the corresponding $M_9$ through $M_1$ bit positions. The primes (′) of the letters described herein, e.g., H, T, U, and M, indicate that a logic 0 (false state) is represented by the primed letter.

The following table is a written summary of the encoding process, whereas table I contains a numerical summary in the form of a truth table.

$M_9$=0 and $M_8$=0 indicate that the hundreds digit is the relatively large digit.

After the relatively large digit, or digits, as the case may be, have been encoded and stored, the remaining digits are simply encoded in octal groups and stored in the remaining locations. Therefore, the tens decimal digit 6 is stored by the octal group $M_6$ through $M_4$ and the units decimal digit 2 is stored by the octal group $M_3$ through $M_1$.

For another example, assume the decimal number 269 is processed into an input register for encoding and storage. For that case, $M_0=1$ to indicate the presence of a single large digit. $M_7$ is also true to indicate that the large digit is a 9. $M_9=1$, and $M_8=0$ to indicate that the units digit is a 9. The octal group $M_6$ through $M_4$ then stores the digit and octal group, $M_3$ through $M_1$ stores the tens digit.

If the tens digit had been a 9, for example, $M_9=0$, $M_8=1$, and $M_7=1$, the hundreds and units digits are stored in the octal groups $M_6$ through $M_4$ and $M_3$ through $M_1$, respectively.

FIG. 2 is a schematic diagram of one embodiment of encoding logic which can be used in implementing block 3 of FIG. 1. Signals representing the logic states of each of the BCD bits $H_4$–$H_1$, $T_4$–$T_1$, $U_4$–$U_1$, representing the decimal number appear on terminals 30 through 41. The numbers are encoded in accordance with tables I and II, described above, by the logic gates designated generally by number 42. The encoded values appear as outputs from NAND-gates 43 through 52. Outputs from the NAND gates provide signals on terminals 53 through 62. The signals are stored in bit positions $M_0$ through $M_1$, as shown. A relatively low, for example electrical ground, signal level is stored as a logic zero and a relatively high, for example +25 volts, is stored as a logic one. Whether or not the "relatively high" voltage level is a + or a − is determined as a function of the particular types of devices being used and the logic convention adopted.

In order to provide primes (') certain of the Binary Coded Decimal inputs ($H_4$, $T_4$, and $U_4$), inverters 63, 64, and 65 are utilized for inverting the inputs on terminals 34 and 38 respectively. Other inverters 66, and 67 are also included as part of the gates represented by numeral 42 in order to implement the encoding logic. NAND-gates 68 through 101 are also required.

Since the encoding process was described in connection with tables I and II, it is not believed necessary to describe the encoding logic shown in FIG. 2 in great detail. However, as a simple illustration, assume that the hundredths digit of the decimal number is an 8 and the remaining digits are small. In that case, $H_4=1$ and $H_3$ through $H_1=0$'s. It is known from the above description that $M_0$ should equal 1, and that $M_9$ through $M_7$ should equal 0's. Therefore, the output from NAND-gate 43 should be high and the outputs from NAND-gates 44 through 46 should be low. Outputs from the other NAND-gates 47 through 52, correspond to the octal values represented by the bits $T_3$–$T_1$ and $U_3$ of the remaining small digits.

The high signal on terminal 30 is inverted through gate 63 and appears as a low input to AND-gate 43. Any low input to a NAND-gate results in a high output. Therefore, a $M_0=1$ as indicated above. The low signal on terminal 31 provides a low input to NAND-gate 69 which results in a high output. Since neither the tens or units digits are 8's or 9's, $T_4$ and $U_4$ are both low. Therefore, the output from NAND-gate 68 is high. In addition, the low signal on terminal 38 is inverted through inverter 65 and provides a third high input to NAND-gate 44. Since all the inputs are high, the output on terminal 54 for $M_9$ is low, A similar analysis can be made for signals on terminals 55 and 56 representing bit positions $M_8$ and $M_7$, respectively.

Logic for the FIG. 2 encoder is summarized below.

$$M_0=H_4+T_4+U_4$$
$$M_9=H_3H_4'T_4'+U_4+H_4T_4$$
$$M_8=H_2H_4'U_4'+T_4+H_4U_4$$
$$M_7=H_1(H_4+T_4'U_4')+T_1H_4'T_4+U_1H_4'T_4'U_4$$
$$M_6=H_3H_4'(T_4U_4'+T_4'U_4)+T_3T_4'U_4'+H_4T_4$$
$$M_5=H_2H_4'(T_4U_4'+T_4'U_4)+T_2T_4'U_4'+H_4U_4$$
$$M_4=H_1H_4'(T_4U_4'+T_4'U_4)+T_1(T_4'U_4'+H_4T_4)+U_1U_4(H_4T_4'+H_4'T_4)$$
$$M_3=H_3H_4'T_4U_4+T_3T_4'U_4+U_3U_4'$$
$$M_2=H_2H_4'T_4U_4+T_2T_4'U_4+U_2U_4'$$
$$M_1=H_1H_4'T_4U_4+T_1T_4'U_4+U_1(U_4'+H_4T_4)$$

FIG. 3 is a schematic diagram of one embodiment of decoding logic which may be used to implement the decoding portion of block 5 shown in FIG. 1. The FIG. 3 embodiment decodes signals representing logic one and logic zero states stored in bit positions $M_0$ through $M_1$ for providing BCD bits representing the previously encoded and stored decimal number. The BCD bits corresponding to bit positions $H_4$–$H_1$, $T_4$–$T_1$, and $U_4$–$U_1$, appear on terminals 102 through 113 for each of the Binary Coded Decimal bits, respectively. The stored logic signals corresponding to bit positions $M_0$ through $M_1$ appear from storage on terminals 114 through 123. Logic gates necessary to decode the stored bits to represent the decimal number are designated generally by the number 124.

OR-gates 125, 126, and 127 provide output signals representing $H_3$ through $H_1$, respectively. OR-gates 128, 129 and 130 provide output signals representing bit positions $T_3$ through $T_1$, respectively, OR-gate 131 provides a signal representing the $U_1$ bit. AND-gate 132 provides an output signal representing $H_4$ and AND-gate 133 provides output signal representing $T_4$. AND-gates 134 and 135 provide signals representing $U_3$ and $U_2$ bits, respectively.

The $M_0$ signal appearing on terminal 114 is inverted through inverter gate 136. Similarly, signals appearing on terminals 115, 116 and 119 representing bit positions $M_9$, $M_8$ and $M_5$, respectively, are inverted through inverter gates 137, 138, and 139, respectively.

Exclusive OR-gate 140 provides the exclusive OR of $M_9$ and $M_8$. The other gates of the decoder logic include AND-gate 141, OR-gate 142, AND-gate 143, OR-gate 144, AND-gates 145 through 169, OR-gates 170 through 179, inverters 180 through 182, and AND-gates 183, 184.

Logic for the FIG. 3 decoder is shown as follows:

$$H_4=M_0(P_1+P_2I_3)$$
$$H_3=M_0'M_9+X_1M_6+P_2P_3M_3$$
$$H_2=M_0'M_8+X_1M_5+P_2P_3M_2$$
$$H_1=S_1M_7+X_1M_4+P_2(I_3M_7+M_0P_3M_1)$$
$$T_4+P_4(M_9'+I_5)$$
$$T_3=S_1M_6+M_3S_2$$
$$T_2=S_1M_5+M_2S_2$$
$$T_1=(S_1+P_2M_6)M_4+P_4M_7(M_9'+P_3)+M_1S_2$$
$$U_4=S_2$$
$$U_3=S_3M_3$$
$$U_2=S_3M_2$$
$$U_1=(I_6=M_8)M_1+P_6M_8'M_7$$
$$P_1=M_9'M_8'$$
$$P_2=M_9M_8$$
$$P_3=M_6'M_5'$$
$$P_4=M_0M_8$$
$$P_5=M_6'M_5$$
$$P_6=M_0M_9$$
$$P_7=M_8M_6M_5'$$
$$X_1=(M_9M_8'+M_9'M_8)M_0$$
$$I_3=M_6+M_5$$
$$I_5=M_6+M_5'$$
$$I_6=M_O'+M_9'$$
$$S_1=M_0'+P_1$$
$$S_2=(M_8'+P_5)P_6$$
$$S_3=I_6+P_7$$

The above logic equations have been simplified somewhat by the $P_1$ through $P_7$ logic terms, the $X_1$ logic term, $I_3$, $I_5$ and $I_6$ terms, and the $S_1$ through $S_3$ terms. The logic equations represented by the terms may be substituted for the terms in the other equations, if desired. For convenience, the Binary Coded Decimal terms were written in the condensed manner indicated.

By way of describing a specific example, assume that the decimal number 962 was stored in bit positions $M_0$ through $M_1$. Therefore, $H_4$ should equal 1, $H_3=0$, $H_2=0$, and $H_1=1$. In addition, $T_4=0$, $T_3=1$, $T_2=1$, and $T_1=0$; $U_4=0$, $U_3=0$, $U_2=$, and $U_1=0$.

Since the most significant digit is a 9 and is the hundreds digit, $M_0=1$, $M_9=0$, $M_8=0$, and $M_7=1$. No attempt will be made to decode the remaining numbers. As indicated previously, octal numbers representing the decimal digits 6 and 2 are stored in octal groups $M_6$ through $M_4$ and $M_3$ through $M_1$, respectively.

Since $M_0$ is a 1, AND-gate 132 receives one true input from terminal 114. The low signal on terminal 115 More inverted to provide a true signal to AND-gate 143. The low signal on terminal 116 is also inverted through gate 138 to provide a second true signal to AND-gate 143. Since both inputs to AND-gate 143 are true, it provides a true output to OR-gate 144. OR-gate 144 then provides a second true input to AND-gate 132 which provides a high output on terminal 102 representing $H_4$. The output on terminal 103 representing bit $H_3$ is low or false since all the inputs to OR-gate 125 are false. More specifically, the AND-gate 141 input to OR-gate 125 is false since AND-gate 141 receives a false input from inverter gate 136. The second input to OR-gate 125 is false since one input to AND-gate 146 is received from exclusive OR-gate 140, whose inputs $M_9$ and $M_8$ are both false. The last input to OR-gate 125 is also false since AND-gate 157 receives an input from AND-gate 156 which receives an input from AND-gate 149 whose inputs $M_9$ and $M_8$ from terminals 115 and 116 are both false. Therefore, the output from AND-gate 157 is false. Since all the inputs to OR-gate 125 are false, the output on terminal 103 representing $H_3$ is also false. A similar explanation is true for the output terminal 104 from OR-gate 126.

The output on terminal 105 representing $H_1$ is a 1 since OR-gate 127 receives a true input from AND-gate 152. AND-gate 152 is true since it receives a true or high signal from terminal 117 representing $M_7$ and a second true input from OR-gate 142. OR-gate 142 receives a true input signal from AND-gate 143. AND-gate 143 is true since the low signal on terminal 115 representing $M_9$ is inverted through gate 137 to provide one true input to AND-gate 143. The second true input to AND-gate 143 is received from inverter gate 138 which inverts the low input on terminal 116.

It should be understood that additional embodiments for other numbering systems could also be provided in a manner similar to the FIGS. 2 and 3. In addition, the encoding and decoding logic would be written and implemented for decimal numbers having other than three digits. Provisions could be made for whole and fractional decimal numbers as well as for the sign of the decimal numbers. It is believed that such modifications are within the abilities of a person skilled in the art, and for that reason such additional embodiments are not described in detail herein.

I claim:

1. A system for the compact storage of decimal numbers having a plurality of decimal digits, said system comprising, encoding logic for examining each decimal digit of a decimal number to determine the value of each relatively high-valued decimal digit and the position of each relatively high-valued decimal digit in the decimal number relative to each other decimal digit, relatively high-valued decimal digits including decimal digits 8, 9, and combinations thereof, a plurality of storage locations, including a first plurality of storage locations responsive to said encoding logic for storing bits of logic information representing the value for position of any relatively high-valued decimal digits in said decimal number, said encoding logic converting each relatively low-valued decimal digit of said decimal number into a binary coded representation, relatively low-valued decimal digits include decimal digits other than a high-valued decimal digit, and said plurality of storage locations including a second plurality of storage locations responsive to said encoding logic for storing the binary coded representation for any relatively low-valued decimal digits in said decimal number.

2. The system as recited in claim 1 wherein said encoding logic further includes means for dividing a decimal number comprising a plurality of digits into a plurality of groups of decimal digits, with each of said groups of decimal digits being encoded by said encoding logic in parallel for being stored in said plurality of storage locations.

3. The system as recited in claim 1 wherein said encoding logic further includes means for dividing a decimal number into a plurality of groups of decimal digits, and means for examining each of said groups of decimal digits serially.

4. The system as recited in claim 1 further comprising decoding logic for examining the bits of logic information stored in said first plurality of storage locations for providing as an output from said system, decimal digits having a value and a position corresponding to the value and position of the relatively high-valued decimal digits in the decimal number examined by said encoding logic, and said decoding logic converting the binary coded representation of each relatively low-valued decimal digit stored in second plurality of storage locations for providing as an output simultaneously with the output of said high-valued decimal digits, the low-valued decimal digits of the decimal number examined by said encoding logic.

5. The system as recited in claim 1 wherein the decimal number examined by said encoding logic is represented by a Binary Coded Decimal numerical code and wherein said encoding logic converts certain decimal digits of said Binary Coded Decimal number into an octal coded decimal number.

6. The system as recited in claim 1 wherein said encoding logic includes logic gates for determining if all decimal digits of the decimal number examined by said encoding logic are in excess of the decimal digit 8, and said plurality of storage locations storing each of the decimal digits in excess of the decimal digit 8.

7. The system as recited in claim 1 wherein said encoding logic includes logic gates for determining if the digits of a decimal number examined by said encoding logic contains a single 8 or 9 digit, said encoding logic providing an input to said first plurality of storage locations for storing a bit representing the value and the position of said single 8 or 9 digit, said encoding logic providing inputs to said second plurality of storage locations for storing the decimal digits of said decimal number examined by said encoding logic in said second plurality of storage locations.

8. The system as recited in claim 1 wherein said encoding logic includes logic gates for determining whether two digits of said decimal number are an 8 and/or a 9 digit and further includes logic gates for indicating the position of the relatively low-valued digits of said decimal number as well as for indicating the value and position of said two digits, said two digits comprising the relatively high-valued decimal digits of said decimal number.

9. The system as recited in claim 1 wherein said encoding logic includes logic gates for indicating whether all the digits of said decimal number are an 8 and/or a 9 digit and for indicating the value and position of each of 8 and/or 9 digits.

* * * * *